3,814,792
PROCESS FOR SHAPING ALIPHATIC POLYAMIDE COMPOSITION
Tamio Arakawa and Yozi Kuroda, Ibaraki, Japan, assignors to Teijin Limited, Osaka, Japan
Filed Mar. 22, 1971, Ser. No. 126,593
Claims priority, application Japan, Mar. 23, 1970, 45/24,721, 45/24,722
Int. Cl. B28b 3/20
U.S. Cl. 264—176 R 7 Claims

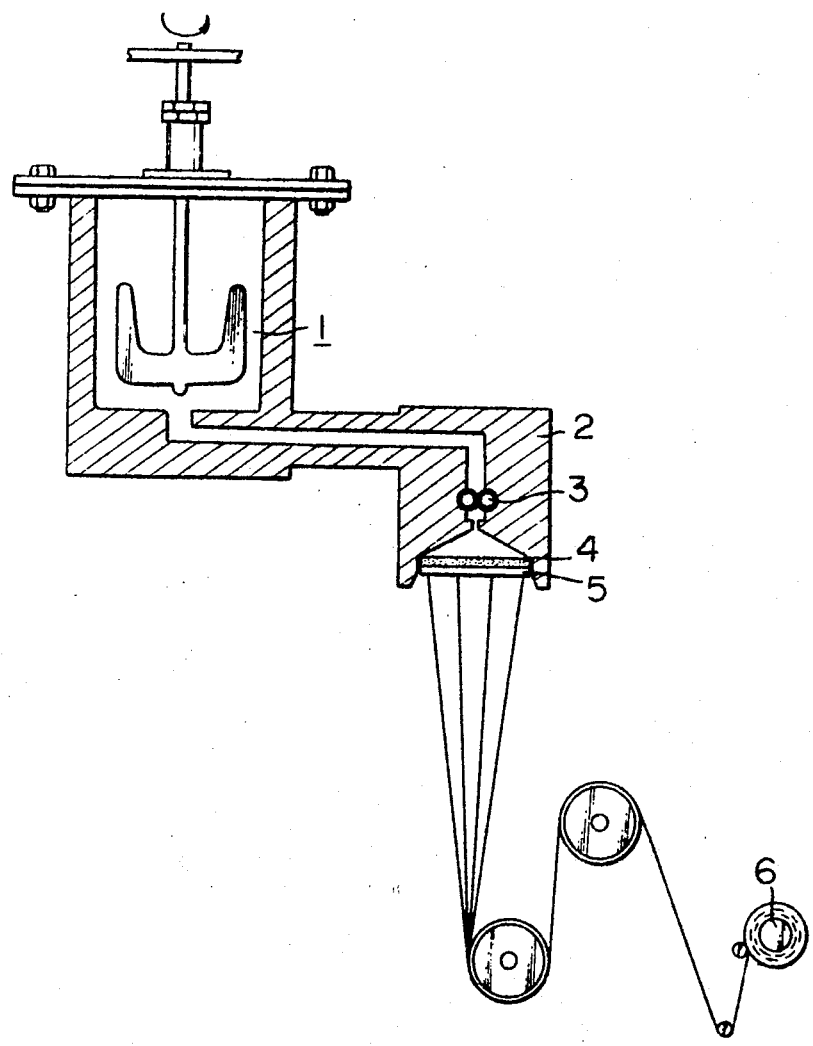

ABSTRACT OF THE DISCLOSURE

A process for shaping a polymer composition by dissolving an aliphatic polyamide or a blend of an aliphatic polyamide and a hydrophilic polymer in a mixed solvent of an aliphatic alcohol having 1 to 4 carbon atoms and water (the alcohol being 15 to 80% by weight) at an elevated pressure at a temperature of at least 130° C. to form a polymer solution having a polymer concentration of 25 to 80% by weight, and extruding the solution into the atmosphere at an extrusion temperature of 115 to 155° C.

---

This invention relates to a process for shaping a polymer composition consisting mainly of aliphatic polyamides, and more particularly to a process for shaping the composition into filaments, tapes, films, sheets and other articles.

Aliphatic polyamides, particularly polycaproamide or polypyrrolidone, have excellent properies such as high strength and good dyeability, and are widely used as fabricated articles such as filaments, tapes, films, and sheets. Usually, the melt shaping method is employed to produce these articles from aliphatic polyamides, which involves melting the polymer, extruding the molten polymer through a die or nozzle, and solidifying it in air, water or in a mold. The melt-shaping process has excellent productivity because of the high speed of shaping, but suffers from various defects which are due to the need for heating the polymer to high temperatures and shaping it in the molten state. Among these defects are:

(a) it is necessary to dry the polymer completely before melting;
(b) thermal degradation of the polymer occurs at the time of melting, and it is impossible to avoid the formation of monomer at the time of melt-shaping;
(c) additives such as antistatic agents, coloring agents, or modifiers for improvement of the quality of polymer that can be used should have sufficient thermal stability at the shaping temperature;
(d) polymers of a high degree of polymerization and a high melt viscosity are difficult to shape; and
(e) vast heat energy is needed to melt the polymer.

An object of the invention is to provide a novel process for shaping aliphatic polyamides without involving the afore-mentioned defects.

Another object of the invention is to provide a novel shaping process which is particularly suitable for fabricating a polymer composition comprising aliphatic polyamides as a major constituent and hydrophilic polymers incorporated for improving the defects of the aliphatic polyamide.

Other objects of the invention will become apparent to those skilled in the art by the following detailed description of the invention.

According to the invention, a process is provided for shaping a polymer composition comprising aliphatic polyamides as a major constituent, which comprises mixing (a) a polymer composition comprising 50 to 100 percent by weight of a polyamide component consisting substantially of at least one aliphatic polyamide obtained by polymerization of one of ω-amino carboxylic acids with 4 to 7 carbon atoms and their derivatives and 0 to 50 percent by weight of a hydrophilic polymer component consisting of at least one hydrophilic polymer, the weights being based on the total weight of the polymer, with (b) a mixed solvent consisting substantially of 15 to 80 percent by weight of at least one aliphatic alcohol having 1 to 4 carbon atoms and 20 to 85 percent by weight of water, the weights being based on the total weight of the solvent, at an elevated pressure at a temperature of at least 130° C. to thereby form a solution containing the polymer in a concentration of 25 to 80 percent by weight based on the combined weight of the polymer and solvent; and thereafter, extruding the solution into an atmosphere substantially at atmospheric pressure at an extrusion temperature of 115 to 155° C.

The process of the invention will be described in greater detail hereinbelow.

By the term aliphatic polyamide, referred to herein, are meant homopolymers or copolymers obtained by the polymerization of at least one ω-amino carboxylic acid with 4 to 7 carbon atoms and their derivatives. The most preferred polyamides for use in the process of the present invention are polymers of ε-caprolactam, polymers of α-pyrrolidone, and blends of these polymers.

The hydrophilic polymer, referred to herein, is meant to be a generic term for any polymer which is soluble in boiling water at a concentration of 10 percent by weight and is further soluble in a solvent consisting of 15 to 80 percent by weight of at least one aliphatic alcohol having 1 to 4 carbon atoms and 20 to 85 percent by weight of water at the polymer concentration of 20 percent by weight. For example, included within the hydrophilic polymers used in the invention are polyvinyl alcohol, polyethylene oxide, polyacrylic acid and its salts, polyacrylamide, and various water soluble derivatives of cellulose. Of these, polyvinyl alcohol is most preferred for quality and cost reasons.

The polymer composition comprising aliphatic polyamides as a major constituent is composed of 50 to 100 percent by the weight of a polyamide component consisting of at least one aliphatic polyamide defined above and 0 to 50 percent by weight of a hydrophilic polymer component consisting of at least one hydrophilic polymer defined above, the amounts of these polymers being based on the total weight of the polymer. If desired, the composition may contain a minor amount of other additives. Examples of the additives, which should be chosen according to the shape and end-use of the shaped article or its uses include coloring agents, delusterants, low molecular weight antistatic agents, anti-soiling agents, flame-retardants, and medications for preventing athlete's foot. The total amount of one or more of these additives is preferably not more than 10 percent by weight of the total weight of the polymer. As is seen from the foregoing definition, a composition consisting only of aliphatic polyamides and thus containing no hydrophilic polymer component also falls into the polymer composition of the invention. The amount of the hydrophilic polymer should preferably be used in an amount of 5 to 50 percent by weight based on the total weight of the polymer.

The polymer to be used in the process of the invention may have any water content, and therefore, it is not necessary to dry polymer chips produced in the polymerization step.

If the amount of the hydrophilic polymer component exceeds 50 percent by weight based on the total weight of the polymer, a shaped article of the polymer composition extruded into an atmosphere substantially at atmospheric pressure will not solidify, and for example, becomes difficult to wind up.

The solvent used in the invention is a mixture of at least one aliphatic alcohol having 1 to 4 carbon atoms and water. Examples of the aliphatic alcohol include methyl alcohol, ethyl alcohol, n-propyl alcohol, i-propyl alcohol, n-butyl alcohol, s-butyl alcohol, and t-butyl alcohol. Of these ethyl alcohol, n-propyl alcohol, and i-propyl alcohol are preferred. The ratio of the alcohol to water in the mixed solvent should be from 15:85 to 80:20 by weight, preferably from 40:60 to 70:30 by weight. If the composition of the solvent is outside the range specified above, its ability to dissolve the polymer composition becomes extremely poor, and a satisfactory solution of the polymer composition cannot be obtained under the conditions to be employed in the invention.

The polymer composition is dissolved in the mixed solvent at a polymer concentration of 25 to 80 percent by weight. When the concentration of the polymer composition in the solution is less than 25 percent by weight, it is difficult to impart an extruding pressure required at the time of shaping, because of the low viscosity of the solution, and the solution may boil before being extruded from a die or nozzle. Furthermore, when the concentration of polymer decreases, the crystallinity of a shaped article made from the polymer generally increases, and accordingly, the stretchability or drawability of the shaped article is reduced. Polymer concentrations above 80 percent by weight will result in an extreme increase in the viscosity of the solution, and it may become impossible to extrude the solution through a die or nozzle. Furthermore, with increasing polymer concentrations, the temperature distribution of the solution becomes non-uniform. For commercial practice, the preferred polymer concentration should be from 45 to 65 percent by weight.

The preparation of the polymer solution must be performed under pressure at a temperature of at least 130° C. When the temperature is below 130° C., it is impossible to form a uniform solution by dissolving the polymer composition completely. The temperature given is therefore the critical temperature for complete dissolution. Since the dissolving temperature to be employed in the present invention is far higher than the boiling point of the mixed solvent at atmospheric pressure, the polymer composition should be dissolved in the mixed solvent at an elevated pressure. Where the process is practised on a commercial basis, the polymer composition and the mixed solvent are placed in a closed pressure vessel and heated to a predetermined temperature. This makes it possible to maintain the solution under pressure by the vapor pressure of the solvent, and there is no need for applying a pressure from outside. If the dissolving temperature is too high, the polymer tends to be hydrolyzed. It is therefore preferred that the temperature at the time of dissolution should be not higher than 180° C.

The solution obtained by the procedure described is maintained at 115 to 155° C. and then extruded into an atmosphere held substantially at atmospheric pressure through a die, nozzle or the like. If the temperature of the polymer solution at the time of extrusion is higher than 155° C., bubbles can be formed in the solution just after the extrusion, and the resulting shaped article will be of little practical value. The shaped article can not be stretched. On the other hand, when the extrusion temperature is lower than 115° C., the polymers may precipitate before the extrusion, and thus the solution cannot be extruded. In order to produce shaped articles of good quality under stable condition in commercial practice, it is preferred that the polymer solution should be prepared at a temperature higher than 150° C., and the resulting solution, cooled to 130–150° C. It is surprising that even when the polymer solution prepared at a temperature higher than 150° C. is cooled to about 130° C., the solution still retains its homogeneous solution state; and that the solution can be fabricated smoothly at temperatures considerably lower than the dissolving temperature described.

The shape and structure of the extrusion opening of the die, nozzle or the like that is used for fabrication can be chosen optionally according to the shape or form of the desired shaped article. For example, when it is desired to prepare filaments, any known spinning nozzles can be used, and where the preparation of tapes, films and sheets is desired, any known T-dies are applicable. The atmosphere into which the polymer solution is extruded may be substantially at atmospheric pressure. In the case of spinning, it is suitable to use a spinning cell and blow air into the cell.

When the polymer solution is extruded into an atmosphere held substantially at atmospheric pressure, a phase of the polymer separates from a phase of the solvent in the solution owing to temperature decrease caused by the evaporation of the solvent. The polymer is precipitated and coagulated, and the desired shaped article is formed. A part of the solvent remains attached to the surface and interior of the shaped article, but can be easily removed by drying in a customary manner.

The accompanying drawing illustrates one embodiment of the apparatus used for producing filaments by the process of the present invention.

Referring to the drawing, the polymer composition is mixed with the solvent at an elevated temperature and an elevated pressure in a dissolving tank 1. The resulting solution is fed at a constant rate by a metering pump 3, and extruded into the atmosphere through a spinneret 5 in a spinning apparatus 2 via a filter 4. The solution extruded is partly separated into a solvent phase and a polymer phase. The solvent is removed by evaporation, and the filaments are wound up onto a wind-updevice. In this apparatus, the solution is always maintained under pressure from the dissolving tank 1 to the spinneret 5, and therefore, all pipings and other accessories should be desired so as to withstand the pressure. The temperature of the dissolving tank 1 should be controlled separately from that of the spinning apparatus 2.

According to the process of the invention, the polymer composition can be fabricated at lower temperatures than are required of the conventional melt-shaping methods. It is therefore possible to shape a polymer composition containing additives which have low thermal stability and is not usable in the conventional melt-shaping methods. High-molecular-weight polymers, which because of their high melting points cannot be shaped by the conventional melt-shaping methods, can be fabricated with satisfactory results by the process of the present invention. Furthermore, the polymer need not be dried before fabrication, and heat energy to be consumed is small. The process is therefore economically advantageous.

The process of the invention as described above includes various preferred embodiments.

In one of such embodiments, a polymer composition is used containing polycaproamide as a major constitutent. By "the polymer composition containing polycaproamide as a major constituent" is meant herein a composition consisting of a homoploymer of ε-caprolactam, a copolyamide containing at least 80 mole percent of ε-caprolactam, as recurring units, or a mixture of such polyamide with a minor amount of one or more additives. In this embodiment, the polymer composition consists only of the polycaproamide, and does not contain a hydrophilic polymer. The polymer composition is mixed with a mixed solvent consisting of 20 to 80 percent by weight of at least one aliphatic alcohol having 1 to 4 carbon atoms and 20 to 80 percent by weight of water at an elevated pressure at a temperature of at least 140° C. to form a solution containing the polymer in a concentration of 30 to 80 percent by weight. It is especially desirable that the solution be extruded at a temperature of 125 to 155° C. into an atmosphere held substantially at atmospheric pressure. In the conventional melt-spinning of polycaproamide, large equipment and much labor are needed for drying polymer chips before spinning, and low-molecular-weight compounds formed by the thermal decomposition of the polymer during the spinning cause the reduction of the quality of the resulting filaments. These defects have been largely eliminated by the application of the process of the present invention, and the following advantages are obtained with the process of the invention in comparison with the conventional melt-shaping methods.

(a) The shaped article contains less compounds having low molecular-weights, and the whiteness of the product is good.
(b) The shaped article has a high crystallinity, and by an ordinary stretching procedure, a product having a high Young's modulus is obtained.
(c) Very little change occurs in the dimension of the shaped article by moisture absorption, and therefore, the wound-up filaments on a bobbin do not collapse.

The process of the invention also has the advantage that polymers having a high degree of polymerization, for example having an intrinsic viscosity of 2.0 in m-cresol at 35° C. can be fabricated without any trouble. As is well known, these polymers are difficult to fabricate by the known melt-shaping methods.

In another preferred embodiment of the invention, a polymer composition is used comprising 50 to 85 percent by weight of a polyamide component containing polycaproamide as a main constituent and 15 to 50 percent by weight of a hydrophilic polymer component consisting of polyvinyl alcohol, the amounts being based on the total amount of the polymers. According to this embodiment, the polymer composition is mixed with a mixed solvent consisting substantially of 20 to 70 percent by weight of at least one aliphatic alcohol having 1 to 4 carbon atoms and 30 to 80 percent by weight of water at 140° C. or above and at an elevated pressure to form a solution containing the polymers in a concentration of 25 to 70 percent by weight. The solution is extruded at a temperature of 125 to 155° C. into an atmosphere held substantially at atmospheric pressure. This procedure is especially desirable for performing the process according to this embodiment. This process is conducive to marked improvements in the Young's modulus, moisture absorption, static prevention, etc. of a shaped article consisting only of polycaproamide. Accordingly, the present embodiment provides a completely new process which is a very effective process for improving the properties of polycaproamide shaped articles.

In still another embodiment preferred in the invention, a polymer composition is used comprising polypyrrolidone as a major component. The polymer of α-pyrrolidone is usually known as nylon-4. In the present specification and claims, the term "polymer composition comprising polypyrrolidone as a major component" is a generic term for a homopolymer of α-pyrrolidone, a copolyamide containing at least 80 mole percent of α-pyrrolidone as recurring units, or a mixture of the polyamide with a minor amount of one or more of the additives. In this embodiment, the use of a mixed solvent consisting substantially of 15 to 50 percent by weight of at least one aliphatic alcohol having 1 to 4 carbon atoms and 50 to 85 percent by weight of water is preferred. It is desired that the polymer composition be mixed with the solvent at a temperature of 130° C. or more at an elevated pressure to form a solution having a polymer concentration of 30 to 80 percent by weight, and then the solution be extruded at an extrusion temperature of 115 to 150° C. into an atmosphere held substantially at atmospheric pressure. The melt-shaping method has been attempted previously to fabricate polypyrrolidone, but has encountered the difficulty that polypyrrolidone is thermally unstable and undergoes marked thermal decomposition during the melt-shaping process. It has been held that the difficulty makes it impossible to perform the melt-shaping method commercially. Various methods have therefore been proposed for shaping polypyrrolidone, and among these are: (1) the extrusion of polypyrrolidone as a solution in formic acid through a die, nozzle or the like, (2) the extrusion of an aqueous solution of polypyrrolidone at an elevated temperature through a die, nozzle or the like so as to coagulate the polymer, and (3) the method comprising dissolving the polymer in zinc chloride or a mixture of it with magnesium nitrate, and extruding the solution into an aqueous solution of sodium nitrate to coagulate the polymer. The method (1) has the defect that the solvent is expensive and difficult to handle. The method (2) has the defect that the polymer has the property of being readily hydrolyzed, and therefore its hydrolysis occurs during the shaping process to reduce its molecular weight, and moreover, the resulting shaped article has poor stretchability because of its high crystallinity. The process (3), on the other hand, suffers from extremely poor productivity. Thus, the various shaping processes which have been proposed previously possess one or more of the defects which make the shaping of polypyrrolidone commercially not viable. Polypyrrolidone is an attractive polymer with various excellent properties. However, the foregoing drawbacks of the shaping process have not led to the realization of commercial production of shaped articles of the polymer.

In contrast, according to the process of the present invention, various advantages are obtained, which include, for example, the following:

(a) The thermal decomposition of the polymer or its hydrolysis has been reduced to a marked extent, and therefore shaped articles having good quality can be obtained.
(b) The solvent to be used is inexpensive and easy to handle.
(c) Shaped articles having good stretchability are obtained, and stretching the articles gives products of excellent physical properties.

Filaments of polypyrrolidone produced by the process of the invention, owing to stretching, have good tenacity and elongation, and superior moisture absorption and dye-ability, and are suitable for apparel applications.

The invention will be described in greater detail by the following examples in which the polycaproamide, polypyrrolidone, polyvinyl alcohol, polyethylene glycol, and polysodium acrylate will be abbreviated as nylon-6, nylon-4, PVA, PEG and PAA-Na.

The various measurement values described in the examples were obtained by the following methods.

Content in weight percent of low-molecular-weight compound in the shaped article.—Five grams of the specimen were dried in hot air at 105° C. for 3 hours, and then weighed (A, gr.). The specimen was then boiled for 3 hours in boiling water, dried in hot air at 105° C. for 3 hours, and weighed (B, gr.). The content (W) of the low-molecular-weight compounds was determined by the following equation.

$$W = \frac{A-B}{A} \times 100 \text{ (percent)}.$$

Melting point.—The endothermic peak (T, °C.) of 10 mg. of the specimen was measured at a heating rate of 5° C./min. using a differential scanning colorimeter DSC-1 Type (Parkin-Elmer Company).

Young's modulus.—Measured at 20° C. and 65% RH at a stretching speed of 5 meters/min. using an Instron tester.

Moisture regain.—The specimen was dried at 105° C. for 3 hours and thereafter left to stand for 4 days at 20° C. and 65% TH. The moisture regain was determined from the amount of moisture absorption at the end of this period.

Specific resistance.—Measured at 20° C. and 65% RH using a commercial conductometer which is designed to measure the electrical conductivity of fibers.

EXAMPLE 1

Using a small-sized plunger-type spinning apparatus containing a closable cylinder, 1.5 g. of nylon-6 chips having an intrinsic viscosity [η] of 1.35, a monomer content of 1.0 percent by weight, and a melting point of 223° C. and 1.5 g. of a mixed solvent (1:1) of n-propyl alcohol and water were put into the cylinder, and mixed at 165° C. for 30 minutes. The polymer solution was cooled to a predetermined temperature (120 to 160° C.) shown in Table 1, and maintained at this temperature for 10 minutes. Thereafter, the solution was extruded into the air through a nozzle of the size indicated in Table 1. Table 1 shows the nozzle size, spinning temperature and the properties of the resulting undrawn filaments. The properties of the undrawn filaments were rated on a scale of very good, good and bad, in which very good indicates that the filaments apparently have no bubbles and contain portions capable of being drawn by at least 150%, good indicates that the filaments have some bubbles and can be drawn by at least 100%, and bad indicates that the filaments have considerable bubbles and cannot be drawn by more than 100%. The intrinsic viscosity [η] was measured by dissolving 0.08 g. of the completely dried specimen in 20 ml. of m-cresol, and measuring the viscosity at 35° C., followed by calculation on the basis of the viscosity measured.

EXAMPLE 2

The procedure of Example 1 was repeated except that the amount of the mixed solvent was changed to 1.0 g. and, therefore concentration of nylon-6 was increased to 60%. The results are given in Table 2.

TABLE 2

| Nozzle size (diameter x length) | Spinning Temperature (° C.) | Pressure (kg./cm.²) | Properties of undrawn filaments | Remarks |
|---|---|---|---|---|
| 0.30 mm. x 6.0 mm | 110 | 400 | | Extrusion impossible. |
| | 135 | 160 | Very good | |
| | 140 | 160 | do | |
| | 160 | 160 | Bad | |

EXAMPLE 3

The procedure of Example 2 was repeated except that ethyl alcohol was used instead of the n-propyl alcohol. The results are given in Table 3.

TABLE 3

| Nozzle size (diameter x length) | Spinning Temperature (° C.) | Pressure (kg./cm.²) | Properties of undrawn filaments | Remarks |
|---|---|---|---|---|
| 0.25 mm. x 5.0 mm | 110 | 400 | | Extrusion impossible. |
| | 130 | 160 | Very good | |
| | 135 | 160 | do | |
| | 160 | 160 | Bad | |
| 0.30 mm. x 4.5 mm | 110 | 400 | | Do. |
| | 130 | 160 | Very good | |
| | 135 | 160 | do | |
| | 160 | 160 | Bad | |
| 0.30 mm. x 6.0 mm | 110 | 400 | | Do. |
| | 130 | 160 | Very good | |
| | 135 | 160 | do | |
| | 160 | 160 | Bad | |

EXAMPLE 4

Chips of nylon-6 having an [η] of 1.35 and a monomer content of 1.0% by weight were dissolved at 165° C. in a mixed solvent of n-propyl alcohol and water (at a weight ratio of 1:1) to form solution of varying concentrations. Each of the solutions was cooled to 135° C., and extruded through a spinning nozzle with a diameter of 0.33 mm. and a length of 4.5 mm. Table 4 shows the polymer concentrations of the solutions and the properties of the undrawn filaments obtained.

TABLE 4

| Polymer concentration (percent) | Viscosity (poise) | Properties of undrawn filaments | Remarks |
|---|---|---|---|
| 20 | ¹1 | Bad | |
| 35 | 10 | Good | |
| 45 | 19 | Very good | |
| 55 | 23 | do | |
| 65 | 34 | do | |
| 75 | 78 | Good | Extrusion uneven. |
| 85 | ∞ | | Extrusion impossible. |

¹ Or less.

TABLE 1

| Nozzle size (diameter x length) | Spinning Temperature (° C.) | Pressure (kg./cm.²) | Properties of undrawn filaments | Remarks |
|---|---|---|---|---|
| 0.25 mm. x 5.0 mm | 110 | 400 | | Extrusion impossible. |
| | 125 | 260 | Good | |
| | 135 | 160 | Very good | |
| | 145 | 160 | do | |
| | 155 | 160 | Good | |
| | 160 | 160 | Bad | |
| 0.30 mm. x 4.5 mm | 110 | 400 | | Do. |
| | 125 | 260 | Good | |
| | 135 | 110 | Very good | |
| | 145 | 110 | do | |
| | 155 | 110 | Good | |
| | 160 | 110 | Bad | |
| 0.30 mm. x 6.0 mm | 110 | 400 | | Do. |
| | 125 | 260 | Good | |
| | 135 | 160 | Very good | |
| | 145 | 160 | do | |
| | 155 | 160 | Good | |
| | 160 | 160 | Bad | |

EXAMPLE 5

Using the spinning apparatus shown in the attached drawing, chips of nylon-6 having an [η] of 1.5 were mixed with a mixed solvent of varying proportions of n-propyl alcohol and water, at the weight ratio of 1:1 in a dissolving tank 1, and the mixture was heated with stirring at 160° C. for 30 minutes with the dissolving tank closed. The solution was fed into a spinning apparatus held at 140° C., metered by a metering pump 3, and filtered by a filter 4. It was then extruded through a spinneret 5 having 18 holes with a nozzle diameter of 0.1 mm., and wound up on a winder 6 at a rate of 300 meters per minute. The resulting undrawn filaments were drawn at 80° C. at a rate of 300 meters per minute using a draw twister having heated rollers. The results obtained are given in Table 5.

TABLE 5

| n-Propanol/ water (weight ratio) | Spinning condition | Draw ratio | Drawn filaments Tenacity (g./d.) | Elongation (percent) |
|---|---|---|---|---|
| 10/90 | Not extrudable | | | |
| 40/60 | Very good | 3.6 | 3.1 | 26 |
| 50/50 | do | 4.0 | 3.8 | 22 |
| 60/40 | do | 4.0 | 4.0 | 22 |
| 85/15 | Not extrudable | | | |

EXAMPLE 6

A solution of the same nylon-6 chips as used in Example 1 in a 1:1 mixed solvent of ethyl alcohol and water was spun under the same conditions as set forth in Example 5 except that the temperature of the spinning apparatus was changed to 133° C., the nozzle diameter was changed to 0.2 mm., and the resulting filaments were wound up at a rate of 500 meters per minute on a winder 6. The resulting package was good in appearance. The undrawn filaments were found to contain 0.9% by weight of monomer, and could be drawn to 4.0 times their original length in water at 60° C. The resulting drawn filaments had a tenacity of 4.2 g./d., an elongation of 11%, and a Young's modulus of 310 kg./mm.$^2$.

When in the foregoing example, the spinning was performed under the same conditions except that the weight ratio of nylon-6 chips to the mixed solvent was changed to 3:2. The resulting filaments could be drawn to 6.0 times their original length in water at 60° C. The resulting drawn filaments had a tenacity of 5.5 g./d., an elongation of 8.5%, and a Young's modulus of 350 kg./mm.$^2$. The filaments also had a density, as measured at 25° C., of 1.55 g./cm.$^3$.

EXAMPLE 7

The same nylon-6 chips and the mixed n-propyl alcohol/water solvent (weight ratio of 50:50) were put into the dissolving tank. The weight ratio of the polymer to the solvent was 3:2. These materials were heated with stirring at 170° C. for one hour. The resulting solution was fed into the spinning apparatus held at 135° C., extruded through a spinneret having a nozzle diameter of 0.2 mm. and wound up at a rate of 500 meters per minute. The resulting undrawn filaments had a monomer content of 1.0%, and could be drawn to 3.0 times their original length in water at 60° C. The drawn filaments had a tenacity of 3.8 g./d., an elongaotion of 20%, and a Young's of 290 kg./mm.$^2$.

COMPARATIVE EXAMPLE 1

Nylon-6 chips same as those used in Example 1 were dried in hot air at 105° C. for 3 hours. The dried chips were fed into a conventional melt-spinning apparatus, melted at 260° C., extruded through a spinnert having a nozzle diameter of 0.3 mm., and wound up at a rate of 500 meters per minute. The resulting undrawn filaments had a monomer content of 2.4% by weight.

It is understood from the results that since the spinning temperatures in Examples 6 and 7 were very low, the undrawn filaments obtained had low monomer content.

The resulting undrawn filaments obtained in this comparative example were drawn to 4.0 times at room temperature. The drawn filaments had a tenacity of 4.5 g./d., an elognation of 27%, and a Young's modulus of 275 kg./mm.$^2$.

COMPARATIVE EXAMPLE 2

The same nylon-6 chips as used in Example 1 and ethyl alcohol were put into a dissolving tank. The weight ratio of the polymer to the solvent was 1:1. The mixture was stirred for one hour at 200° C. to form a solution. The solution was fed into a spinning apparatus held at 170° C. Attempt to extrude the solution through a spinneret having a nozzle diameter of 0.2 mm. failed because of too high a viscosity of the solution. When the temperature of the spinning part of the apparatus was raised to 190° C., the solution could be extruded. However, an abrupt and vigorous burst occurred at the time of extrusion, and it was impossible to wind up the extruded filaments. The resulting undrawn filaments were drawn in water at 60° C., but were broken when stretched by about 10%.

EXAMPLE 8

Chips of nylon-6 having an [η] of 2.0 and a monomer content of 1.1% by weight (which are difficult to spin by the conventional melt-spinning process) were mixed with a mixed solvent of n-propyl alcohol and water (at a weight ratio of 50:50) at a ratio of 3:2 by weight, and the mixture was heated with stirring at 170° C. for one hour in a closed vessel. The solution was cooled to 135° C., extruded through a spinneret having a nozzle diameter of 0.2 mm., and wound up at a rate of 500 meters per minute. The resulting undrawn filaments had an [η] of 1.95 and a monomer content of 1.1%.

EXAMPLE 9

In the shaping apparatus shown in the accompanying drawing, a slit die having a length of 50 mm. and a width of 0.5 mm. was mounted instead of the spinneret 5. Using this apparatus, a nylon-6 film was formed under the conditions shown in Example 6. The resulting film could be stretched at room temperature. It could be also drawn biaxially at a draw ratio of 3.0 in each of the lateral and vertical directions to form a biaxially oriented, tough film. This film was opaque, and it was possible to write on it with ink.

EXAMPLE 10

Two kilograms of nylon-4 having an intrinsic viscosity [η] of 4.9 and a monomer content of 2.1% which had been prepared by the anionic polymerization method, 1.4 kg. of distilled water and 0.5 kg. of n-propanol were put into the dissolving tank 1 shown in the attached drawing, and the mixture was stirred at 160° C. for 30 minutes. The resulting solution was fed into a spinning apparatus 2, held at 130° C. and extruded through the spinneret 5 having a nozzle diameter of 0.1 mm. into air at room temperature. The filaments were wound up on the winder 6 at a rate of 500 meters per minute.

The undrawn filaments were obtained substantially in a dry condition, and had an intrinsic viscosity [η] of 4.0 and a monomer content of 1.9%. The filaments were drawn to 4.5 times their original length using a snubbing pin, and wound up at a rate of 450 meters per minute. They were left to stand for 24 hours in an atmosphere conditioned at 65% RH and 25° C., and then their physical properties were measured. The drawn filaments had a tenacity at break of 3.6 g./d., an elongation at break of 17%, and an initial Young's modulus of 260 kg./mm.². The intrinsic viscosity [η] of nylon-4 was determined by dissolving the polymer in 90% formic acid to form a solution having a polymer concentration of 0.2%, and measuring the viscosity at 25° C., followed by calculation on the basis of the viscosity measured.

The undrawn filaments obtained (Nos. 1 to 4) were each drawn to 3.5 to 4.0 times their original length. The physical properties of the resulting drawn filaments are shown in Table 7.

TABLE 7

| Number | Draw ratio | Tenacity (g./d.) | Elongation (percent) | Young's modulus (kg./mm.²) |
|---|---|---|---|---|
| 1 | 3.5 | 2.8 | 66 | 183 |
| 2 | 4.0 | 3.6 | 22 | 204 |
| 3 | 4.0 | 3.4 | 60 | 197 |
| 4 | 4.0 | 3.6 | 19 | 250 |

EXAMPLE 12

The same nylon-4 as used in Example 10 was mixed with a mixed solvent of n-propyl alcohol and water (weight ratio 1:2), and the mixture was stirred for 30 minutes at 160° C. The resulting solution having a polymer concentration of 50% was spun at varying temperatures, and drawn. The results are shown in Table 8.

TABLE 8

| Spinning temperature (° C.) | Spinning condition | Undrawn filaments (η) | Monomer content | Draw ratio | Tenacity (g./d.) | Elongation (percent) | Young's modulus (kg./mm.²) |
|---|---|---|---|---|---|---|---|
| 110 | Much extrusion, non-uniformity | | | (¹) | | | |
| 120 | Small breakage | 4.0 | 1.8 | 4.0 | 3.2 | 20 | 210 |
| 130 | Very good | 3.9 | 1.7 | 4.0 | 3.6 | 22 | 212 |
| 140 | do | 3.9 | 1.7 | 3.5 | 3.0 | 25 | 188 |
| 160 | Frequent filament breaks | | | (¹) | | | |

¹ Drawing impossible.

EXAMPLE 11

The same nylon-4 as used in Example 10 was added in varying amounts to a mixed solvent of n-propanol and water (at a weight ratio of 1:2), and the mixture was stirred for 30 minutes at 160° C. to form solutions having a polymer concentration of 40 to 85%. Each of the solutions was spun at the most desirable spinning temperatures. The spinning conditions and the properties of the resulting undrawn filaments are given in Table 6.

TABLE 6

| No. | Polymer concentration (percent) | Spinning temperature (° C.) | Spinning condition | (η) | Monomer content (percent) |
|---|---|---|---|---|---|
| 1 | 40 | 130 | Some filament breaks | 4.0 | 1.6 |
| 2 | 50 | 130 | Very good | 4.0 | 1.8 |
| 3 | 60 | 132 | do | 4.3 | 1.7 |
| 4 | 70 | 134 | Some filament breaks | 4.3 | 1.6 |
| 5 | 85 | 140 | Not extrudable | | |

EXAMPLE 13

Nylon-4 same as that used in Example 10 was dissolved at 160° C. in various mixed solvents to form solutions having a polymer concentration of 50%. Each of the solution was spun at the temperature indicated, and drawn at the ratios indicated. The results obtained are given in Table 9.

TABLE 9

| Composition of solvent (weight ratio) | Spinning temperature | Undrawn filaments (η) | W (percent) | Draw ratio | Tenacity (g./d.) | Elongation (percent) | Young's modulus (kg./mm.²) |
|---|---|---|---|---|---|---|---|
| Water/methanol (3:1) | 128 | 3.7 | 1.7 | 4.0 | 3.8 | 21 | 204 |
| Water/ethanol (3:1) | 130 | 3.6 | 1.7 | 4.0 | 3.4 | 18 | 197 |
| Water/ethanol (2:1) | 135 | 4.0 | 1.8 | 4.0 | 3.6 | 20 | 211 |
| Water/n-propanol (3:1) | 130 | 3.6 | 1.8 | 3.5 | 3.2 | 19 | 185 |
| Water/n-propanol (2:1) | 130 | 4.0 | 1.7 | 4.0 | 3.5 | 17 | 213 |
| Water/i-propanol (3:1) | 130 | 3.6 | 1.8 | 3.5 | 3.0 | 23 | 172 |
| Water/n-butanol (3:1) | 130 | 3.5 | 1.5 | 3.5 | 3.0 | 20 | 185 |

EXAMPLE 14

Nylon-4 having an [η] of 4.9 was mixed in various mixed solvents of varying proportions of n-propyl alcohol and water at 160° C. to form polymer solutions having a polymer concentration of 60%. Each of the solutions was spun at a spinning temperature of 135° C. through a spinnerete having nozzles each with a diameter of 0.3 mm. and a length of 4.5 mm. at a spinning pressure of 160 kg./cm.². The resulting undrawn filaments were drawn to 4.0 times their original length. The results are given in Table 10.

TABLE 10

| Concentration of n-propanol (percent) | Spinning condition | Undrawn filaments (η) | Drawn filaments Tenacity (g./d.) | Drawn filaments Elongation (percent) |
|---|---|---|---|---|
| 0 | Non-extrudable | | | |
| 10 | Non-uniform extrusion | 3.2 | Undrawable | |
| 20 | Very good | 3.7 | 3.3 | 16 |
| 30 | do | 4.0 | 3.6 | 19 |
| 40 | do | 4.2 | 3.5 | 18 |

COMPARATIVE EXAMPLE 3

Nylon-4 having an $[\eta]$ of 4.9 was mixed with water at a weight ratio of 6:4, and the mixture was stirred for 30 minutes at 160° C. The polymer was dissolved with great difficulty. Attempts to extrude the solution at 130° C. failed because of its extremely high viscosity. Accordingly, it was spun at 145° C. Attempts to draw the resulting filament at a draw ratio of 3.0 failed, but they could be drawn when the draw ratio was reduced to 2.5. The spinning conditions, and the physical properties of the undrawn filaments and drawn filaments are given below.

Spinning conditions:

| | |
|---|---|
| Temperature °C | 145 |
| Pressure kg | 160 |
| Nozzle size mm | 0.3 x 45 |
| $[\eta]$ of undrawn filaments | 2.9 |

Drawn filaments:

| | |
|---|---|
| Tenacity g./d | 2.1 |
| Elongation percent | 22 |

EXAMPLE 15

In the shaping apparatus shown in the attached drawing, a slit die having a length of 50 mm. and a width of 0.5 mm. was mounted instead of the spinneret 5. Using this apparatus, a nylon-4 film was formed under the same conditions as set forth in Example 10. The resulting film could be drawn at room temperature. When it was drawn uniaxially at a draw ratio of 3.0, a tough film was obtained.

EXAMPLE 16

Using the spinning apparatus shown in the accompanying drawing, 1,200 g. of nylon-6 chips having an $[\eta]$ of 1.5, 800 g. of nylon-4 having an $[\eta]$ of 4.9 (the ratio of nylon-6/nylon-4 being 60/40), 800 g. of n-propyl alcohol and 1,200 g. of water (the ratio of the n-propanol/water being 40/60) were put into the dissolving tank 1, and the mixture was heated under stirring for 30 minutes at 160° C. with the tank closed. The solution was fed into the spinning device 2 held at 140° C., metered by the metering pump 3, filtered by the filter 4, and extruded into the atmosphere through the spinneret having 18 holes with a nozzle diameter of 0.1 mm. The filaments were wound up at a rate of 300 meters per minute. The undrawn filaments were drawn at a draw rate of 300 meters per minute at 140° C. to 3.8 times the original length using a draw twister having heated rollers. The resulting filaments had a tenacity of 3.1 g./d., an elongation of 20%, a Young's modulus of 268 kg./mm.$^2$, and an improved value of moisture regain of 8.3%.

EXAMPLE 17

Using the same spinning apparatus as used in Example 16, 1,190 g. of nylon-6 chips having an $[\eta]$ of 1.5, 510 g. of polyvinyl alcohol having a degree of polymerization of 2,000 and a saponification degree of 100% (the ratio of nylon-6/PVA being 70/30), 765 g. of n-propanol, and 935 g. of water (ratio of n-propanol/water being 45/55) were put into the dissolving tank 1. The solution was spun and drawn under the same conditions as set forth in Example 16 except that the wind up rate was 200 meters per minute and the draw ratio was changed to 3.6. The resulting drawn filaments had a tenacity of 3.5 g./d., an elongation of 28%, and a Young's modulus of 410 kg./mm.$^2$ which showed a marked improvement over the Young's modulus of the ordinary nylon-6 drawn filaments (200 to 250 kg./mm.$^2$).

EXAMPLE 18

Using the same spinning apparatus as used in Example 17, 900 g. of nylon-6 chips having an $[\eta]$ of 1.5, 600 g. of polyvinyl alcohol having a degree of polymerization of 2,000 and a saponification degree of 100% (ratio of nylon-6/polyvinyl alcohol being 60/40), 600 g. of n-propanol, and 900 g. of water (n-propanol/water being 40/60) were dissolved in the dissolving tank 1. The solution was spun under the same conditions as set forth in Example 17. The resulting undrawn filaments were drawn to 3.9 times their original length under the same conditions as set forth in Example 17. The drawn filaments had a tenacity of 4.2 g./d., an elongation of 22%, and a Young's modulus 540 kg./mm.$^2$ which showed a marked improvement over the Young's modulus of ordinary nylon-6.

EXAMPLE 19

In the spinning apparatus used in Example 17, a slit die having a size of 0.1 mm. x 20 mm. was mounted instead of the spinneret, and a film was formed at a wind-up rate of 50 meters per minute. The resulting film was opaque, and it was possible to write on it with ink. When the film was uniaxially drawn at a draw ratio of 3.0, a uniaxially oriented, tough film was obtained.

EXAMPLE 20

Using the same spinning apparatus as used in Example 17, 1,710 g. of nylon-6 chips having an $[\eta]$ of 1.5, 190 g. of polyethylene glycol having a degree of polymerization of 8,000 (the ratio of the nylon-6/polyethylene glycol being 90/10), 900 g. of ethanol, and 900 g. of water (the ratio of ethanol/water being 50/50) were put into the dissolving tank 1. The solution was spun under the same conditions as set forth in Example 17, and the resulting undrawn filaments were wound up on a winder. The undrawn filaments were drawn to 3.6 times their original length at a draw rate of 300 meters per minute using a drawtwister having heated rollers. The drawn filaments had a tenacity of 2.5 g./d., an elongation of 25%, a Young's modulus of 280 kg./mm.$^2$, and a specific resistance of $2 \times 10^9$ ohms which showed a marked reduction over the specific resistance ($10^{12}$ ohms) of ordinary nylon-6 drawn filaments. The filaments had a moisture regain of 6.5%, which showed a marked improvement over ordinary nylon-6 drawn filaments (moisture regain 3 to 4%).

EXAMPLE 21

The procedure of Example 20 was repeated except that polysodium acrylate (PAA-Na) having a degree of polymerization was used instead of the polyethylene glycol. The resulting drawn filaments had a tenacity of 2.4 g./d., an elongation of 25%, a Young's modulus of 260 kg./mm.$^2$, a specific resistance of $3 \times 10^9$ ohms, and a moisture regain of 6.7%. These filaments had improved specific resistance and moisture regain over those of ordinary nylon-6 drawn filaments.

EXAMPLE 22

Using the same spinning apparatus as used in Example 16, 1,120 g. of nylon-4 having an $[\eta]$ of 4.9, 480 g. of polyvinyl alcohol having a degree of polymerization of 2,000 and a saponification degree of 100% (the ratio of nylon-4/polyvinyl alcohol being 70/30), 720 g. of n-propanol, and 1,680 g. of water (the ratio of n-propanol/water being 30/70) were dissolved in the dissolving tank 1, and the mixture was stirred for 30 minutes at 160° C. with the tank closed. The resulting solution was fed into the spinning device 2 held at 130° C., extruded into the atmosphere through the spinneret 5 having 18 holes with a nozzle diameter of 0.1 mm., and wound up at a rate of 500 meters per minute. The undrawn filaments were drawn in the same way as set forth in Example 16. The resulting drawn filaments had a tenacity of 3.6 g./d., an elongation of 23%, a Young's modulus of 367 kg./mm.$^2$, and a moisture regain of 9.5%.

EXAMPLE 23

Using the same spinning apparatus as set forth in Example 16, 800 g. of nylon-6 chips having an intrinsic viscosity of 1.5, 600 g. of nylon-4 having an $[\eta]$ of 4.9, and 600 g. of polyvinyl alcohol having a degree of polymerization of 2,000 and a saponification degree of 100%, (nylon-6/nylon-4/PVA being 4:3:3) were spun and drawn under the same conditions as set forth in Example 16. The resulting drawn filaments had a tenacity of 4.0 g./d., an elongation of 22%, a Young's modulus of 403 kg./mm.$^2$ and a moisture regain of 8.5%.

EXAMPLE 24

Using the same spinning apparatus as used in Example 16, 1,200 g. of nylon-6 chips having an [η] of 1.5, 600 g. of polyvinyl alcohol having a degree of polymerization of 2,000 and a saponification degree of 100%, 200 g. of polyethylene glycol having a degree of polymerization of 8,000, (the ratio of nylon-6/PVA/polyethylene glycol being 6:3:1), 900 g. of n-propyl alcohol and 1,100 g. of water (n-propanol/water being 45/55) were put into the dissolving tank 1. The solution was spun and drawn under the same conditions as set forth in Example 16. The resulting filaments had a tenacity of 3.4 g./d., an elongation of 21%, a Young's modulus of 375 kg./mm.$^2$, a moisture regain of 6.8% and a specific resistance of $3 \times 10^9$ ohms.

EXAMPLE 25

Using the same spinning apparatus as used in Example 16, a polymer composition comprising nylon-6 having an [η] of 1.5 and polyvinyl alcohol having a degree of polymerization of 2,000 and a saponification degree of 100% in varying proportions shown in Table 11 was mixed with a mixed solvent comprising ethanol and water at varying ratios shown in Table 11. The solution was spun and then drawn by the same apparatus as used in Example 16. The results are given in Table 11.

TABLE 11

| | | | | |
|---|---|---|---|---|
| Nylon-6/PVA (weight ratio) | 80/20 | 70/30 | 60/40 | 40/60 |
| Ethanol/water (weight/ratio) | 50/50 | 45/55 | 40/60 | 40/60 |
| Polymer concentration | 50 | 50 | 50 | 40 |
| Dissolving conditions | (¹) | (¹) | (¹) | (¹) |
| Spinning temperature (° C.) | 140 | 140 | 140 | 140 |
| Nozzle diameter and number of holes | (²) | (²) | (²) | (²) |
| Extruding rate (meter/min.) | 530 | 530 | 530 | 530 |
| Wind-up rate (meters/min.) | 340 | 340 | 340 | (*) |
| Spinning pressure (kg./cm.$^2$) | 100 | 117 | 130 | 133 |
| Spinning temperature (° C.) | 140 | 140 | 140 | |
| Draw ratio | 3.8 | 3.8 | 4.0 | |
| Tenacity (g./d.) | 3.5 | 3.8 | 4.1 | |
| Elongation (percent) | 28 | 26 | 20 | |
| Young's modulus (kg./mm.$^2$) | 350 | 430 | 520 | |
| Moisture regain (percent) | 4.7 | 5.3 | 6.1 | |

¹ 160° C., 30 minutes.
² 0.1 mm., ×18 holes.
*The filaments did not solidify and it was impossible to wind it up.

We claim:

1. A process for shaping by extruding a polymer composition comprising a film and fiber-forming aliphatic polyamide as a major constituent, which comprises mixing (a) a polymer composition comprising 50 to 100 percent by weight of a polyamide component consisting essentially of polycaproamide and 0 to 50 percent by weight of a hydrophilic polymer component consisting essentially of at least one component selected from polyvinyl alcohol, polyethylene oxide, polyacrylic acid and salts of polyacrylic acid and polyacrylamide, the weights being based on the total weight of the polymer, with (b) a mixed solvent consisting essentially of 15 to 80 percent by weight of at least one aliphatic alcohol having 1 to 4 carbon atoms and 20 to 85 percent by weight of water, the weights being based on the total weight of the solvent, at an elevated pressure at a temperature of at least 130° C. to thereby form a solution containing the polymer in a concentration of 35 to 80 percent by weight based on the combined weight of the polymer and solvent; and thereafter, extruding the solution into an atmosphere substantially at atmospheric pressure at an extrusion temperature of 115 to 155° C.

2. A process of claim 1, wherein the polyamide component is polycaproamide.

3. A process of claim 2, wherein the hydrophilic polymer component is polyvinyl alcohol.

4. A process of claim 1, wherein said polymer composition consists of 50 to 95 percent by weight of said polyamide component and 5 to 50 percent by weight of said hydrophilic polymer component, the amounts being based on the total weight of the polymers.

5. A process for shaping polycaproamide, which comprises mixing (a) polycaproamide with (b) a mixed solvent consisting substantially of 20 to 80 percent by weight of at least one aliphatic alcohol having 1 to 4 carbon atoms and 80 to 20 percent by weight of water, at an elevated pressure at a temperature of at least 140° C. to form a solution having a polymer concentration of 30 to 80 percent by weight; and thereafter, extruding the solution at a temperature of 125 to 155° C. into an atmosphere held substantially at atmospheric pressure.

6. A process for shaping a mixture of polycaproamide and polyvinyl alcohol, which comprises mixing (a) a polymer composition comprising 50 to 85 percent by weight of a polyamide composition consisting essentially of polycaproamide and 15 to 50 percent by weight of a hydrophilic polymer component consisting essentially of polyvinyl alcohol, with (b) a mixed solvent consisting essentially of 20 to 70 percent by weight of at least one aliphatic alcohol having 1 to 4 carbon atoms and 30 to 80 percent by weight of water, at an elevated pressure at a temperature of at least 140° C. to form a solution having a polymer concentration of 35 to 70 percent by weight; and thereafter extruding the solution at a temperature of 125 to 155° C. into an atmosphere held substantially at atmospheric pressure.

7. The process of claim 1 wherein the polymer concentration in the solution is 45 to 65 percent by weight.

References Cited

UNITED STATES PATENTS

| | | | |
|---|---|---|---|
| 2,320,088 | 5/1943 | Leekley | 260—29.2 N |
| 2,342,387 | 2/1944 | Catlin | 260—29.2 N |
| 2,695,835 | 11/1954 | Hare | 264—206 |
| 2,824,848 | 2/1958 | Wittcoff | 260—29.2 N |
| 2,895,786 | 7/1959 | Schlack | 260—29.2 N |
| 3,076,774 | 2/1963 | Black et al. | 260—29.2 N |
| 3,185,660 | 5/1965 | Best | 260—34.2 |
| 3,219,601 | 11/1965 | Koontz | 260—29.6 N |
| 3,368,992 | 2/1968 | Altermatt | 260—29.2 N |
| 3,402,231 | 9/1968 | Bynum et al. | 264—182 |
| 2,742,440 | 4/1956 | Stott et al. | 260—29.2 N |
| 2,951,054 | 8/1960 | Hess | 260—29.2 N |
| 3,432,483 | 3/1969 | Peoples et al. | 260—87.3 |

JAY H. WOO, Primary Examiner

U.S. Cl. X.R.

260—29.2 N, 78 S; 264—205, 211